United States Patent
Gant et al.

(10) Patent No.: US 11,078,984 B1
(45) Date of Patent: Aug. 3, 2021

(54) STRUCTURE MOVEMENT DAMPING SYSTEM USING TENSION ELEMENT

(71) Applicant: United States of America as represented by the Administrator of NASA, Washington, DC (US)

(72) Inventors: Frederick Scott Gant, Huntsville, AL (US); Robert E. Berry, Madison, AL (US); W. Neill Myers, Huntsville, AL (US); Jeffrey Lee Lindner, Madison, AL (US); John S. Townsend, Union Grove, AL (US)

( * ) Notice: Subject to any disclaimer, the term of this patent is extended or adjusted under 35 U.S.C. 154(b) by 0 days.

(21) Appl. No.: 17/063,319

(22) Filed: Oct. 5, 2020

(51) Int. Cl.
F16F 15/02 (2006.01)
F16F 15/12 (2006.01)

(52) U.S. Cl.
CPC ........ F16F 15/022 (2013.01); F16F 15/1201 (2013.01)

(58) Field of Classification Search
CPC .... F16F 15/022; F16F 15/1201; F16F 15/121; F16F 7/14
See application file for complete search history.

(56) References Cited

U.S. PATENT DOCUMENTS

| 3,043,566 | A | * | 7/1962 | Grise | B60P 1/14 74/89.2 |
| 3,360,225 | A | * | 12/1967 | Camossi | B29C 45/14565 248/638 |
| 3,371,895 | A | * | 3/1968 | Speranza, Jr. | F16F 7/14 248/566 |
| 3,946,976 | A | * | 3/1976 | Radford | F16F 7/14 248/580 |
| 4,846,446 | A | | 7/1989 | Peppel et al. | |
| 6,086,007 | A | | 7/2000 | Till | |
| 7,371,199 | B2 | | 5/2008 | Joslyn | |
| 9,475,673 | B2 | | 10/2016 | Feldstein et al. | |
| 2013/0341453 | A1 | * | 12/2013 | Sandvik | B66D 1/50 242/419.7 |
| 2019/0276284 | A1 | * | 9/2019 | Robb | B66C 13/10 |
| 2020/0355166 | A1 | * | 11/2020 | Mortensen | F16F 13/06 |

FOREIGN PATENT DOCUMENTS

| DE | 10309825 A1 * | 9/2004 | F16F 9/3214 |
| DE | 102018100868 B3 * | 2/2019 | F16F 7/14 |

* cited by examiner

*Primary Examiner* — Melody M Burch
(74) *Attorney, Agent, or Firm* — James J. McGroary; Helen M. Galus

(57) ABSTRACT

A damping system includes a spool about which a tension line is wound. The line's first end is coupled to a first structure subject to forces causing unwanted movement thereof. A damper is coupled to a second structure not subject to the unwanted movement of the first structure. The damper is coupled to the spool for engagement with the spool to slow a rotational speed thereof when the spool rotates in a first direction. The damper is disengaged from the spool when the spool rotates in a second direction in opposition to the first direction. A device, coupled to the line's second end and to the second structure, applies a tension force to the line's second end. The tension force is exceeded when the first structure moves to place the line in tension, and is not exceeded when the first structure moves to place the line in compression.

10 Claims, 4 Drawing Sheets

US 11,078,984 B1

STRUCTURE MOVEMENT DAMPING SYSTEM USING TENSION ELEMENT

ORIGIN OF THE INVENTION

The invention described herein was made in the performance of work under a NASA contract and by an employee of the United States Government and is subject to the provisions of Public Law 96-517 (35 U.S.C. § 202) and may be manufactured and used by or for the Government for governmental purposes without the payment of any royalties thereon or therefore.

BACKGROUND OF THE INVENTION

1. Field of the Invention

This invention relates to damping systems. More specifically, the invention is a system that damps out unwanted movement of a structure undergoing dynamic movement using a tension element coupled to the structure.

2. Description of the Related Art

There are a variety of structure arrangements where dynamic or cyclic deflection and/or vibration behavior between two structures can produce undesirable results. For example, the relationship between a rocket support tower and a rocket is one where some off-axis rocket dynamic deflection (e.g., due to wind) relative to its rigid support tower is allowable, but excessive relative dynamic deflection is problematic and/or destructive. While conventional springs and dampers can be used to control the unwanted movement, solutions using such devices can impose unwanted loads and/or be too large and bulky for the spatial constraints dictated by the environment.

SUMMARY OF THE INVENTION

Accordingly, it is an object of the present invention to provide a damping system for structures.

Another object of the present invention is to provide a damping system configurable for a variety of two-structure arrangements.

Still another object of the present invention is to provide a damping system for damping vibrations in one structure relative to another structure.

Yet another object of the present invention is to provide a spatially efficient damping system for damping unwanted vibrations in a first structure relative to a second structure that is not subject to the unwanted vibrations.

Other objects and advantages of the present invention will become more obvious hereinafter in the specification and drawings.

In accordance with the present invention, a damping system for structures includes a spool about which a line is wound. The line is one that exhibits rigidity in tension and flexibility in compression. The line's first end is coupled to a first structure subject to forces causing unwanted movement thereof. A damper is coupled to a second structure not subject to the unwanted movement of the first structure. The damper is coupled to the spool for engagement with the spool to slow a rotational speed thereof when the spool rotates in a first direction. The damper is disengaged from the spool when the spool rotates in a second direction in opposition to the first direction. A device, coupled to the second end of the line and to the second structure, applies a tension force to the second end of the line. The tension force is exceeded when the first structure moves to place the line in tension, and is not exceeded when the first structure moves to place the line in compression.

BRIEF DESCRIPTION OF THE DRAWING(S)

Other objects, features and advantages of the present invention will become apparent upon reference to the following description of the preferred embodiments and to the drawings, wherein corresponding reference characters indicate corresponding parts throughout the several views of the drawings and wherein.

DESCRIPTION OF THE PREFERRED EMBODIMENT(S)

Figure 1:
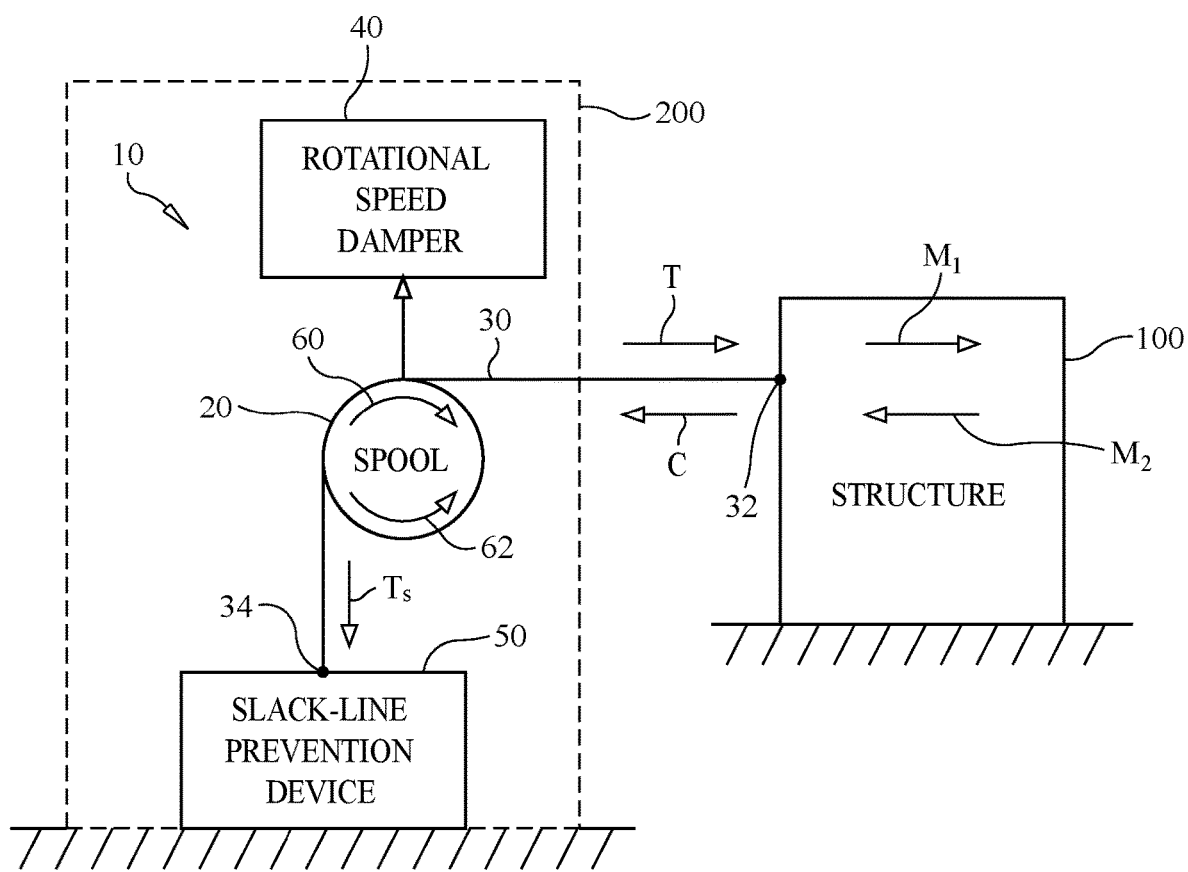
FIG. 1 is a top-level schematic view of a damping system for structures in accordance with present invention.

Referring now to the drawings and more particularly to FIG. 1, a damping system for structures in accordance with the present invention is shown and is referenced generally by numeral 10. Damping system 10 cooperates between two existing structures 100 and 200, neither of which is part of the present invention. In general, structure 100 is one that is subject to undesirable or unwanted movement that could be caused by changes in the environment or changes that are man-made without departing from the scope of the present invention. Structure 200 is one that is not subject to the unwanted movement such that it can serve as a supporting ground for parts of damping system 10 as will be explained further below. Real-world examples of arrangements using structure 100/structure 200 include, but are not limited to, a rocket and its supporting tower, a boat/ship mast and its boat/ship, a free-standing tower and the ground on which it is mounted, aircraft wings and the aircraft's fuselage, etc.

Damping system 10 includes a spool 20, a flexible line 30, a rotational speed damper 40, and a slack-line prevention device 50. Spool 20, damper 40, and slack-line prevention device 50 are supported/mounted on structure 200. Line 30 is coupled on one end 32 to structure 100, and is coupled on its other end 34 to slack-line prevention device 50. Line 30 is wound around spool 20.

Line 30 is a tension element that exhibits stiffness or rigidity and strength when placed in tension, but is flexible in bending when placed in compression. Materials used for line 30 can vary depending on an application's requirements. For example, steel or stainless steel cables can be used for higher-load applications, and rope or line materials such as Kevlar, Spectra, or nylon could be used in other lower-load applications.

Spool 20 is generally a cylindrical body around which line 30 is wound or wrapped. The surface of spool 20 that engages with line 30 can be flat or helically grooved (i.e. to resemble annular threads) such that the line 30 rests in the helical groove. The turns of line 30 wrapped around spool 20 should be in a single layer to prevent line 30 from wrapping on itself. That is, each turn of line 30 around spool 20 radially engages spool 20 but does not radially engage another turn of line 30. The number of turns of line 30 on spool 20 is chosen to support the tension load given the coefficient of friction between line 30 and spool 20.

Rotational speed damper 40 is any device or mechanism capable of slowing the rotational speed of spool 20. In terms of the present invention and as will be explained further below, damper 40 engages with spool 20 to slow or damp the rotational speed thereof when line 30 is placed in tension causing spool 20 to rotate as indicated by arrow 60. Line 30 is placed in tension "T" whenever structure 100 experiences movement "$M_1$" that pulls on end 32 of line 30 to thereby place line 30 in tension T. However, damper 40 disengages from spool 30 when line 30 is placed in compression "C" whenever structure 100 experiences movement "$M_2$" that pushes on end 32 of line 30 to thereby place line 30 in compression C. Spool 20 is able to rotate freely when disengaged from damper 40.

Slack-line prevention device 50 is any device or mechanism capable of applying a relatively small and constant tension force "$T_s$" to line 30 at its end 34. Device 50 is configured to provide tension force $T_s$ that is exceeded whenever structure 100 experiences movement $M_1$, and that can act on line 30 to remove all slack therein when structure 100 experiences movement $M_2$. Since spool 20 is disengaged from damper 40 during movement $M_2$, tension force $T_s$ will cause spool 20 to rotate in direction 62 that is opposite to direction 60. Device 50 can be realized using one or more springs, weights, or combinations thereof without departing from the scope of the present invention.

In operation, when structures 100 and 200 move away from one another, i.e., causing movement $M_1$, line 30 is pulled at end 32 and is placed in tension T that exceeds tension force $T_s$ thereby causing spool 20 to rotate in direction 60. As spool 20 rotates in direction 60, damper 40 is engaged to slow the rotational speed of spool 20, thereby damping movement $M_2$. When structures 100 and 200 move towards one another, i.e., causing movement $M_2$, line 30 is placed in compression C at end 32 such that tension force $T_s$ causes spool 20 to rotate in direction 62 such that spool 20 is disengaged from damper 40. The above-described operation repeats in a cyclical fashion as structures 100 and 200 experience dynamic or cyclical movement away and towards one another.

Figure 2:
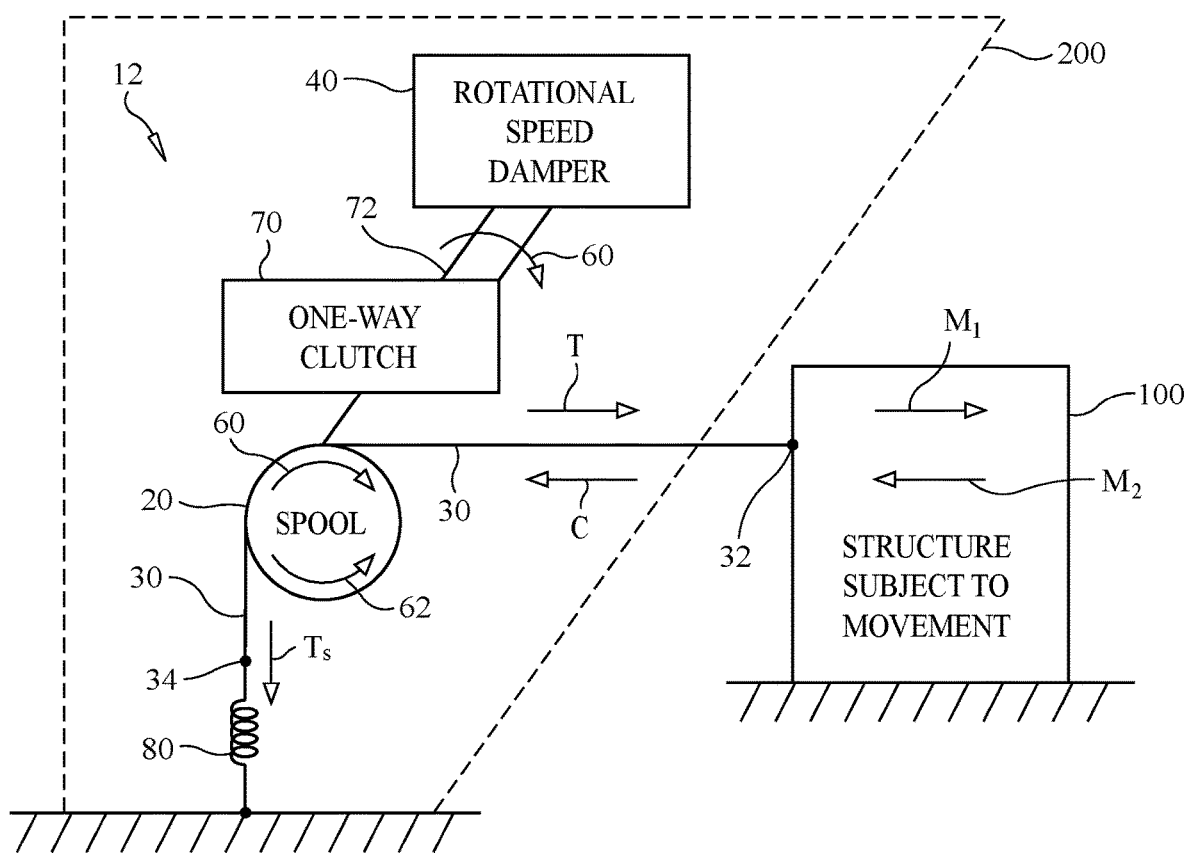
FIG. 2 is a schematic view of a damping system for structures in accordance with an embodiment of the present invention.

As mentioned above, a variety of devices and/or mechanisms could be combined to provide the unique damping system of the present invention. By way of a non-limiting example, FIG. 2 illustrates an embodiment of the present invention's damping system and is referenced generally by numeral 12. In system 12, the above-described spool 20 and damper 40 are coupled together by a one-way clutch 70 and a rotatable shaft 72. More specifically, clutch 70 is coupled to spool 20 and shaft 72 such that clutch 70 engages with shaft 72 when the spool is rotating in direction 60 and disengages from shaft 72 when spool is rotating in direction 62. In this way, shaft 72 will rotate in direction 60 in correspondence with spool 20. Shaft 72 is coupled to damper 40. Accordingly, damper 40 slows the rotational speed of shaft 72 and spool 20 when both are rotating in direction 60. Damping system 12 includes a spring 80 for the above-described slack-line prevention device 50. Spring 80 is coupled between end 34 of line 30 and structure 200 to apply the above-described constant tension force $T_s$.

Figure 3:
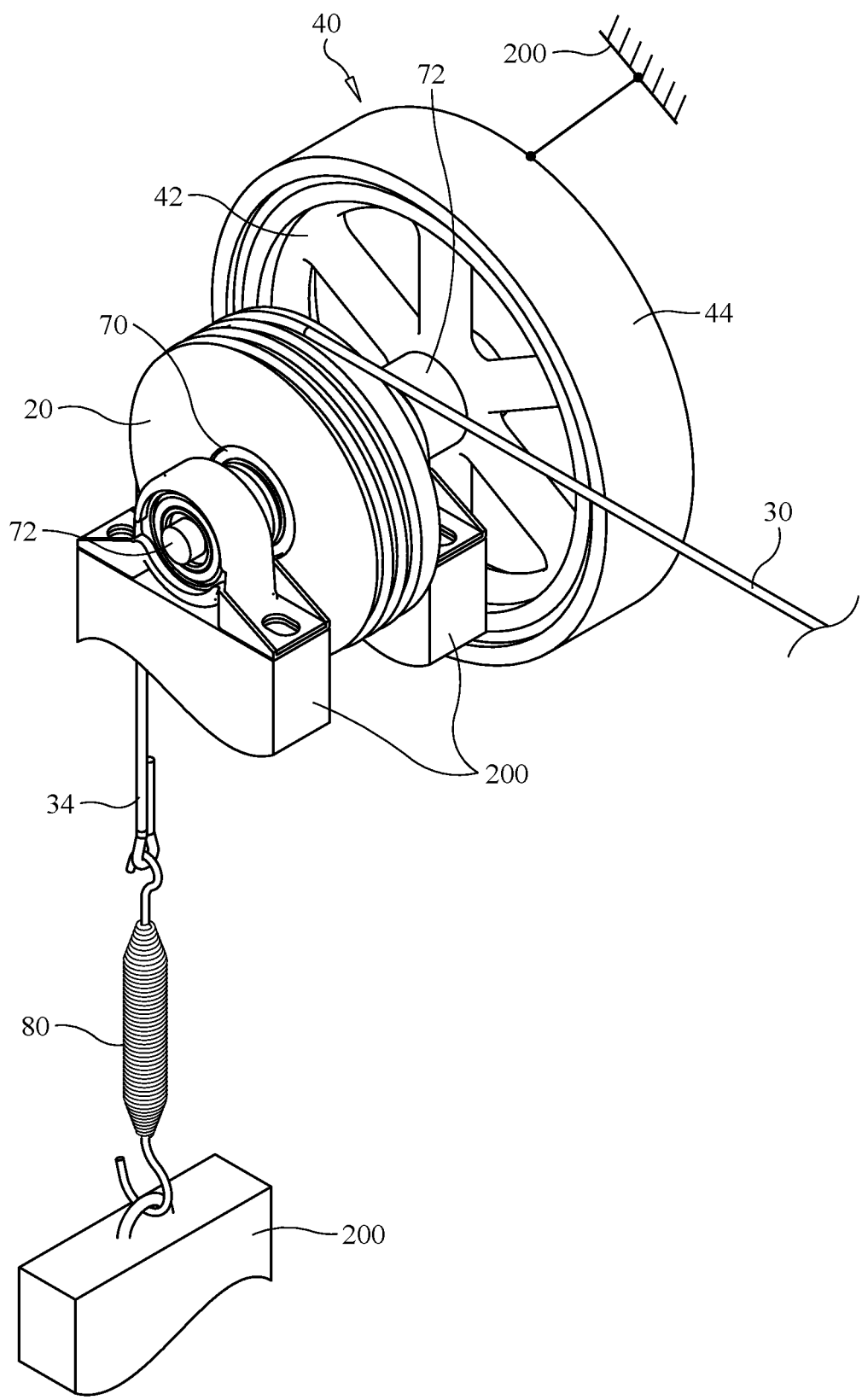
FIG. 3 is a schematic view of a perspective view of a damping system using a rotating damper in accordance with an embodiment of the present invention.

As mentioned above, the present invention can be realized with different types of rotational speed dampers. For example, FIG. 3 illustrates a damping system of the present invention constructed in accordance with the teachings presented in FIGS. 1 and 2 where damper 40 is a rotating viscus damper. In this embodiment, damper 40 has a rotating wheel 42 fixedly coupled to shaft 72 for rotation therewith, and has a fixed annular resistor 44 that acts to slow the rotational speed of wheel 42 in proportion to the speed of wheel 42. Annular resistor 44 can be realized by coulomb (dry) friction device, a magnetic resistance device, or other viscous damping devices known in the art. The above-described one-way clutch 70 can be a conventional roller clutch coupled between spool 20 and shaft 72 in ways known in the art. Annular resistor 44 is fixed to structure 200 as indicated schematically in FIG. 3.

Figure 4:
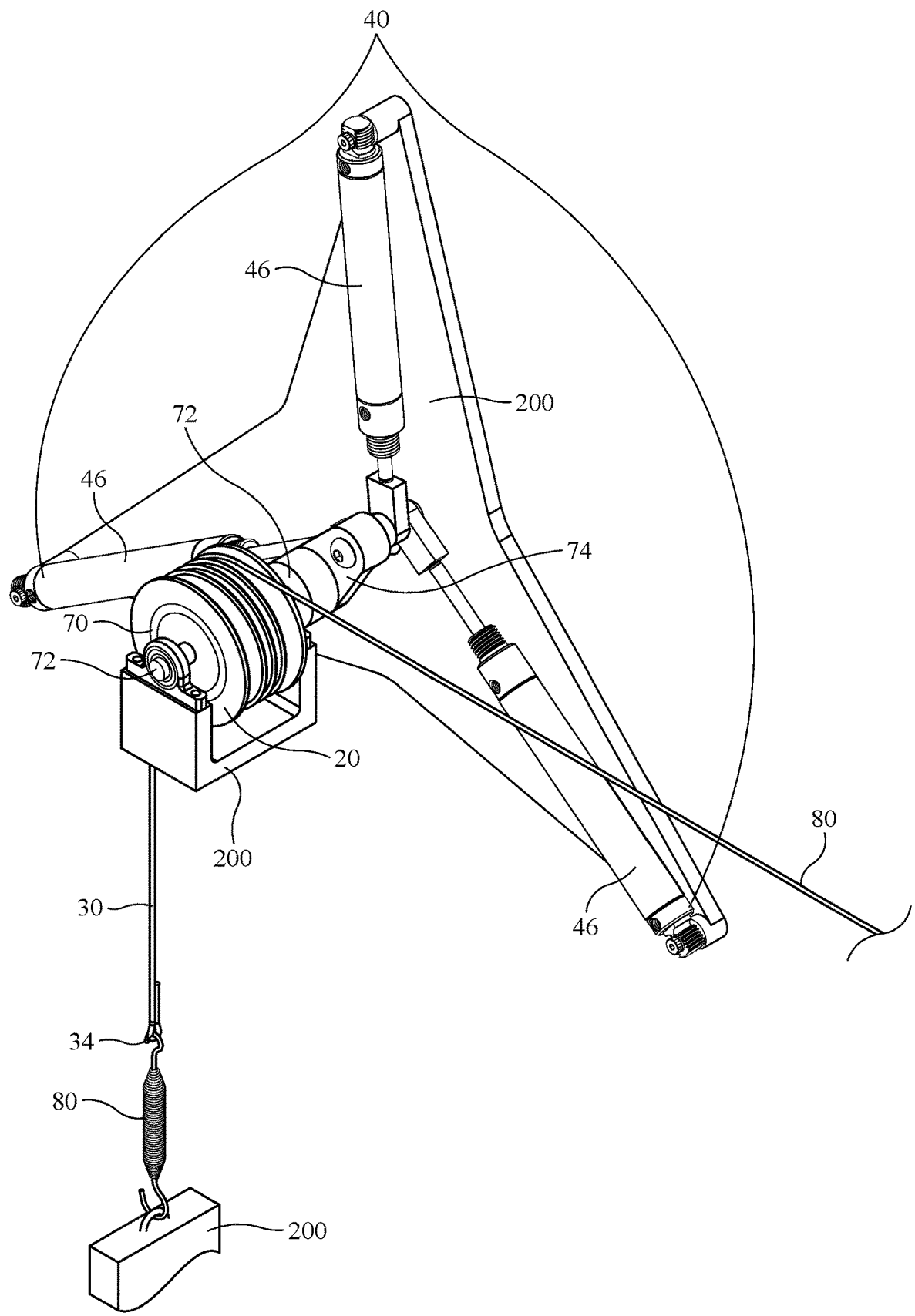
FIG. 4 is a perspective view of a damping system using linear dampers in accordance with another embodiment of the present invention.

Another type of rotational speed damper 40 is illustrated in FIG. 4 where shaft 72 is coupled to damper 40 via crank arm 74 that rotates eccentrically with shaft 72 when it rotates in direction 60 as described above. The eccentric rotation of crank arm 74 is rotationally slowed by damper 40 that comprises a plurality of linear dampers 46, each of which is coupled between crank arm 74 and structure 200. As crank arm 74 is turned by shaft 72, linear dampers 46 are extended or shortened by the eccentric rotating end of crank arm 74. The linear dampers 46 provide a damping force proportional to their extension and compression velocity, and apply that damping force to crank arm 74 at its eccentrically rotating end. Linear dampers 46 can be oil or gas filled piston devices, gas cylinder devices, etc., without departing from the scope of the present invention.

The advantages of the present invention are numerous. The present invention applies a tension-activated, speed-dependent damping force to damp movement in one direction of a dynamic system. Applying the damping force in tension only allows the system to use simple and relatively lightweight tension elements that are readily available in highly efficient forms. Further, by only requiring a simple attachment point to a moving structure, the present invention minimizes any location and/or orientation requirements in a given application. The present invention's application of a relatively small slack-line-prevention tension can be implemented with a variety of simple devices/mechanisms to further contribute to the system's simplicity and reliability.

Although the invention has been described relative to a specific embodiment thereof, there are numerous variations and modifications that will be readily apparent to those skilled in the art in light of the above teachings. For example, the present invention could incorporate a transmission mechanism between the system's spool and damper that increases or decreases the damper's input rotation rate relative to that of the spool. It is therefore to be understood that, within the scope of the appended claims, the invention may be practiced other than as specifically described.

What is claimed as new and desired to be secured by Letters Patent of the United States is:

1. A damping system for structures, comprising:
   a spool;
   a line for exhibiting rigidity in tension and flexibility in compression, said line including a first end adapted to be coupled to a first structure subject to forces causing unwanted movement thereof, said line wound around said spool and extending to a second end of said line;
   a one-way clutch coupled to said spool for rotation therewith;
   a shaft coupled to said clutch wherein said shaft is engaged for rotation therewith when said spool and said clutch rotate in a first direction as caused by said line being in tension, and wherein said shaft is disengaged from said clutch when said spool and said clutch rotate in a second direction in opposition to said first direction as caused by said line being in compression;

a damper coupled to said shaft for slowing rotational speed of said shaft rotating in said first direction; and a spring coupled to said second end of said line and adapted to be coupled to a second structure not subject to the unwanted movement of the first structure, said spring applying a tension force to said second end of said line, wherein said tension force is exceeded when the first structure moves to place said line in tension, and wherein said tension force is not exceeded when the first structure moves to place said line in compression.

2. A damping system as in claim 1, wherein said damper comprises a rotating damper.

3. A damping system for structures, comprising:

a spool;

a line for exhibiting rigidity in tension and flexibility in compression, said line including a first end adapted to be coupled to a first structure subject to forces causing unwanted movement thereof, said line wound around said spool and extending to a second end of said line;

a one-way clutch coupled to said spool for rotation therewith;

a shaft coupled to said clutch wherein said shaft is engaged for rotation therewith when said spool and said clutch rotate in a first direction, and wherein said shaft is disengaged from said clutch when said spool and said clutch rotate in a second direction in opposition to said first direction;

a damper coupled to said shaft for slowing rotational speed of said shaft rotating in said first direction, wherein said damper comprises a plurality of linear dampers; and a spring coupled to said second end of said line and adapted to be coupled to a second structure not subject to the unwanted movement of the first structure, said spring applying a tension force to said second end of said line, wherein said tension force is exceeded when the first structure moves to place said line in tension, and wherein said tension force is not exceeded when the first structure moves to place said line in compression.

4. A damping system as in claim 3, further comprising a support structure coupled to said shaft for supporting said rotation thereof, said support structure being isolated from the unwanted movement of the first structure.

5. A damping system as in claim 3, wherein said line is wound around said spool in a single-layer wrap.

6. A damping system for structures, comprising:

a spool;

a line for exhibiting rigidity in tension and flexibility in compression, said line including a first end adapted to be coupled to a first structure subject to forces causing unwanted movement thereof, said line wound around said spool and extending to a second end of said line;

a damper adapted to be coupled to a second structure not subject to the unwanted movement of the first structure, said damper coupled to said spool for engagement with said spool to slow a rotational speed thereof when said spool rotates in a first direction and for disengagement from said spool when said spool rotates in a second direction in opposition to said first direction, wherein said damper comprises a plurality of linear dampers; and a device coupled to said second end of said line and adapted to be coupled to the second structure, said device applying a tension force to said second end of said line, wherein said tension force is exceeded when the first structure moves to place said line in tension, and wherein said tension force is not exceeded when the first structure moves to place said line in compression.

7. A damping system as in claim 6, wherein said line is wound around said spool in a single-layer wrap.

8. A damping system as in claim 6, wherein said device comprises a spring.

9. A damping system for structures, comprising:

a spool;

a line for exhibiting rigidity in tension and flexibility in compression, said line including a first end adapted to be coupled to a first structure subject to forces causing unwanted movement thereof, said line wound around said spool and extending to a second end of said line;

a one-way clutch coupled to said spool for rotation therewith;

a shaft adapted to be mechanically and rotationally supported at a second structure not subject to the unwanted movement, said shaft coupled to said clutch wherein said shaft is engaged for rotation therewith when said spool and said clutch rotate in a first direction, and wherein said shaft is disengaged from said clutch when said spool and said clutch rotate in a second direction in opposition to said first direction;

a damper coupled to said shaft for slowing rotational speed of said shaft rotating in said first direction, wherein said damper comprises a plurality of linear dampers; and a spring coupled to said second end of said line and adapted to be coupled to a second structure not subject to the unwanted movement of the first structure, said spring applying a constant tension force to said second end of said line, wherein said constant tension force is exceeded when the first structure moves to place said line in tension, and wherein said constant tension force is not exceeded when the first structure moves to place said line in compression.

10. A damping system as in claim 9, wherein said line is wound around said spool in a single-layer wrap.

* * * * *